Figure 1:
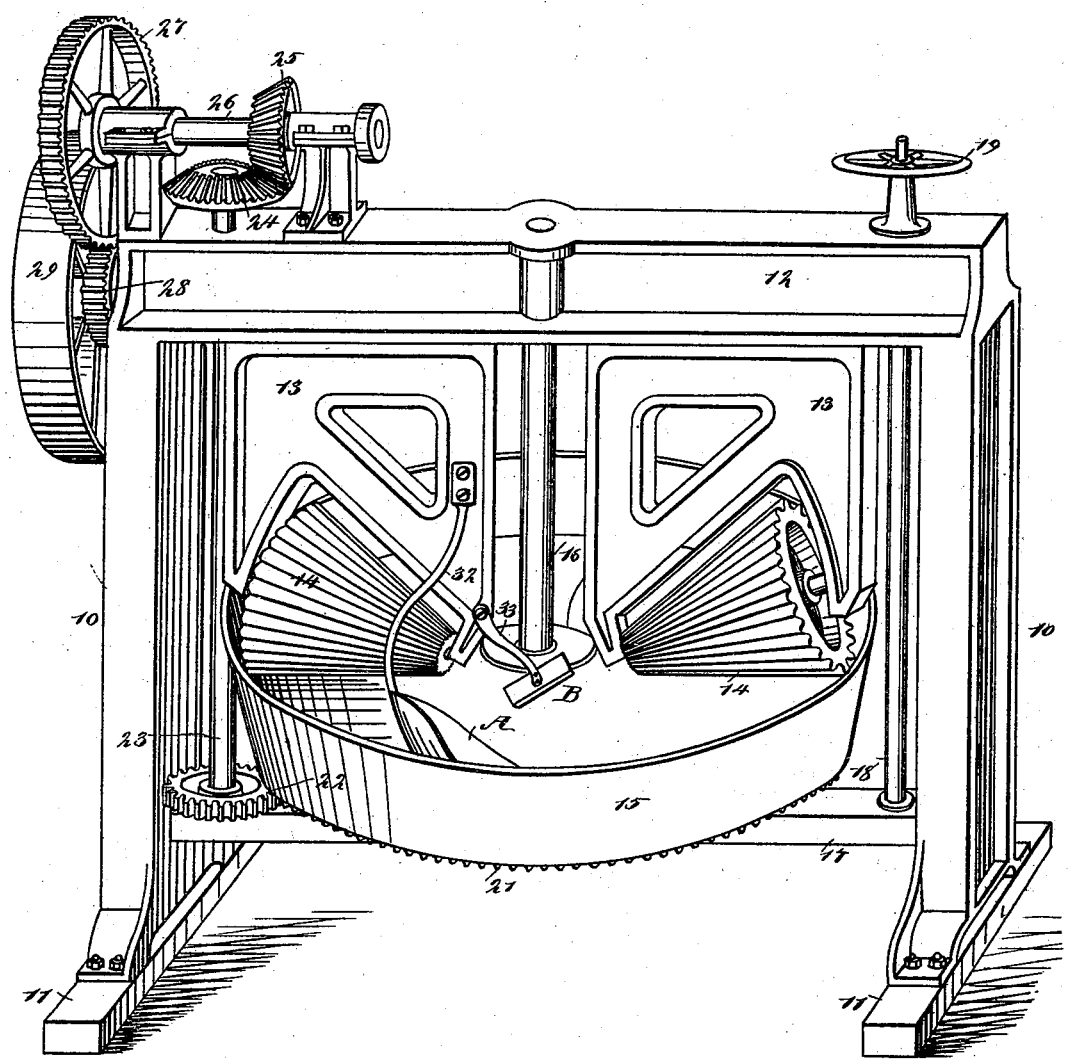

(No Model.) 2 Sheets—Sheet 1.

A. WITZ.
MIXING MACHINE.

No. 506,086. Patented Oct. 3, 1893.

WITNESSES:
C. Neveux
E. Sedgwick

INVENTOR
A. Witz
BY
ATTORNEYS.

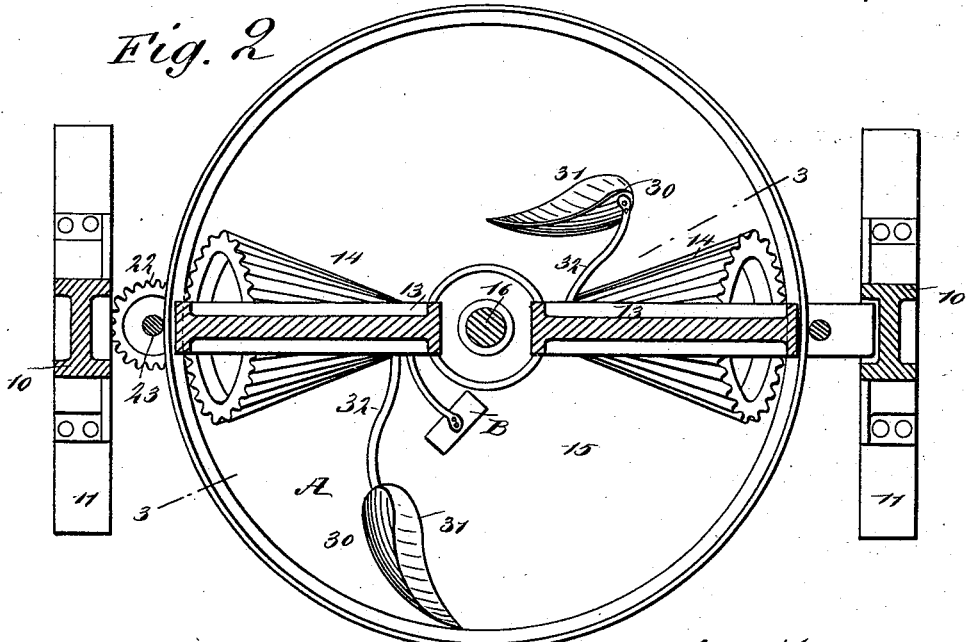
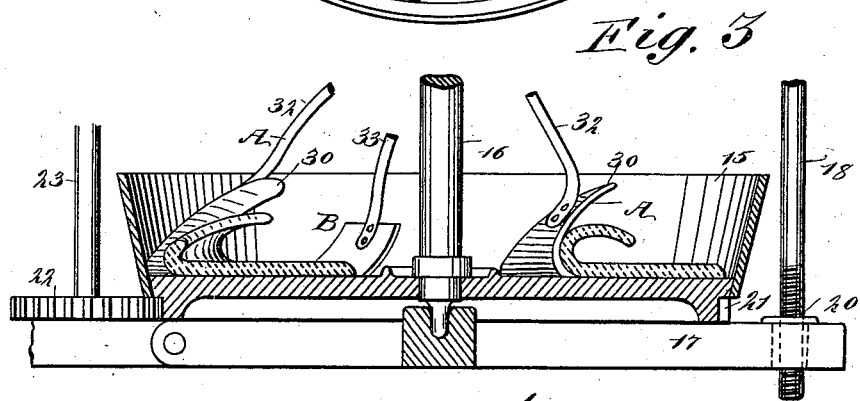
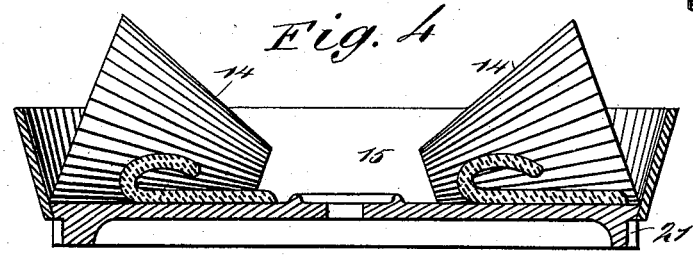
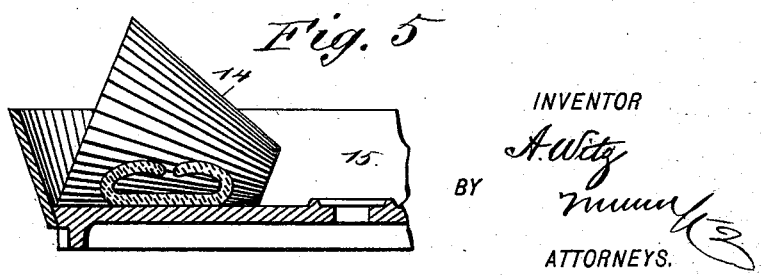

UNITED STATES PATENT OFFICE.

AUGUSTE WITZ, OF NEW YORK, N. Y.

MIXING-MACHINE.

SPECIFICATION forming part of Letters Patent No. 506,086, dated October 3, 1893.

Application filed June 24, 1893. Serial No. 478,769. (No model.)

*To all whom it may concern:*

Be it known that I, AUGUSTE WITZ, of New York city, in the county and State of New York, have invented a new and useful Improvement in Mixing-Machines, of which the following is a full, clear, and exact description.

My invention relates to an improvement in mixing machines, and it has for its object to provide a machine adapted for mixing or kneading paste of any description, as for example, such paste as is used in the manufacture of macaroni, and the object of the invention is to so construct the machine that the paste will be constantly turned over upon itself and be presented in that manner to the kneading or mixing rolls.

Another object of the invention is to so construct the shovels and locate them in the paste pan that the shovels will turn over the paste massed at its edges, carrying what was the outer edge inward over the body of the mass, thus insuring a thorough mixing or kneading of the material being operated upon.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the improved mixing machine. Fig. 2 is a horizontal section through the frame, the rolls, shovels and mixing pan being shown in plan view. Fig. 3 is a vertical section through the mixing pan and its support, illustrating the shovels in action. Fig. 4 is a section through the mixing pan, illustrating the manner in which the paste mass is presented to the mixing rolls; and Fig. 5 is a partial vertical section through the paste pan, illustrating the position that the paste mass will assume when two shovels are employed at each side of the pan.

The frame of the machine consists of uprights 10, each provided with a suitable base 11, said uprights being connected at the top by a cross bar 12. From each side of the center of this cross-bar hangers 13, are projected vertically downward, and in said hangers conical mixing rolls 14, are journaled.

The mixing rolls and the manner in which they are journaled constitute no portion of the invention, and the rolls illustrated are those of ordinary construction. The mixing pan 15 may likewise be of the usual construction, and is connected with a shaft 16 which passes down through its center, the shaft being journaled in the central portion of the upper cross bar 12, and likewise in the central portion of a lower cross beam 17, the latter cross beam or bar being vertically adjustable in the frame, and the adjustment of this cross bar is effected through the medium of an adjusting shaft 18, usually located at one end of the lower bar, and extending upward through the upper cross bar 12. The upper end of the shaft is provided with a hand wheel 19, and its lower end is threaded, as shown at 20 in Fig 3, and passes through a suitable nut or threaded thimble located in the lower cross bar. The pan is provided upon its bottom surface at the periphery with teeth 21, and these teeth are adapted to engage with a gear 22, said gear being mounted upon the lower end of a shaft 23, and the shaft is journaled in the upper and lower cross bars 12 and 17. The shaft 23, is usually driven by mounting upon its upper end a beveled gear 24 and causing the said gear to mesh with a like gear 25, located upon a driven shaft 26 journaled in suitable bearings at the upper portion of the machine frame. The shaft 26, at its outer end, carries a large gear 27, and said gear meshes with a pinion 28 located upon the drive shaft, which drive shaft is provided with a pulley 29; or the shaft may be revolved by hand if in practice it is found desirable.

The main feature of the invention consists in the arrangement of the shovels A, which are located within the mixing pan. The said shovels A consists preferably of sheet metal bent upon itself to a substantially U-shape in cross section, the upper member of the shovel, designated as 30, considerably overhanging its lower member 31. The shovel may be of any desired length and is made somewhat tapering longitudinally, being essentially pointed at one of its ends. Ordinarily these shovels are so placed that they are upon opposite sides of the shaft 16 to which the mixing pan is secured, the shovels being practically diametrically opposite, as shown in Fig. 2; but their contracted portions face in opposite directions, and one shovel is located near the center of the pan while the other is located at or near the periphery thereof. The reduced end of the shovel near the periphery of the pan may be brought in engagement practically with the sides thereof, while the pointed end of the opposite shovel is located a predetermined distance from the center of the pan. The shovels do not stand in a line at right angles to a line drawn through the center of the pan between the shovels, but at more or less of an obtuse angle to such a line.

In the operation of the shovels located as above set forth, as the pan is revolved by manipulating the drive shaft and connected gearing, as shown in Fig. 3 the outer shovel will cause the outer edge of the paste mass to be curved upward and in direction of the center of the pan over the body portion of the mass, while the shovel nearer the center will cause the inner edge of the mass to be curved upward and outward, as likewise shown in Fig. 3, over the body of the mass; and as the shovels remain stationary and likewise the bearings of the mixing rolls, the shovels will maintain at all times the same relative position with reference to the rolls, and after the mass has been turned up by the shovels it will be presented to the rolls in the manner shown in Fig. 4, that is, with the outer edge curved inward over the body of the mass and the inner edge curved outward over the body of the mass. In this manner the mixing rolls will thoroughly mix what was the outer or edge portions of the mass in with the body portion, and cause other portions of the mass to form the margins.

It will be readily observed that when the shovels are employed the particles of the mass are being thoroughly and constantly shifted, and each and every part will be thoroughly and effectually operated upon and mixed. The shovels are held stationary within the pan by securing to the upper part of each shovel at its wider end a shank 32, and securely fastening said shank to the hangers 13.

It may happen that fragments of the paste mass under treatment may separate themselves from the body of the mass and be thrown by centrifugal force to the central portion of the pan. In this event it is desirable that such fragments should be returned to the body of the mass and this is accomplished by locating adjacent to the center of the pan a shovel B, placing the same diagonally within the pan; and the shovel B, is usually made rectangular as illustrated, and is connected by means of a shank 33 with the lower portion of one of the hangers 13.

If in practice it is found desirable, two shovels may be located at each side of the shaft 16 of the pan. The concaved faces of the shovels in this event are made to face one another, and the result of such a grouping is shown in Fig. 5, in which it will be observed that both the inner and outer edges of the mass are turned over upon the body, the outer edge facing inward and the inner edge outward. When the two sets of shovels are employed the commingling of the particles of the mass is much more rapidly effected than when two shovels only are used.

Having thus described my invention, I claim as new and desire to secure by Letters Patent—

1. In a mixing machine, the combination, with a revolving mixing pan, and means, substantially as shown and described, for rotating the pan, of mixing rolls the bearings whereof are stationary, and shovels attached to fixed supports, said shovels being located one near the periphery of the pan and another near the center, the inner face of one shovel and the outer face of the opposite shovel being concaved, the concaved surfaces facing the edges of the mass under treatment, whereby said edges are turned over upon the body as the pan revolves, the shovels being made longitudinally tapering, substantially as and for the purpose specified.

2. In a mixing machine, the combination, with a revolving mixing pan, and means, substantially as shown and described, for rotating the pan, of mixing rolls, the bearings whereof are stationary, and shovels attached to fixed supports, said shovels being located one near the periphery of the pan and the other near the center, the inner face of one shovel and the outer face of the opposite shovel being concaved, the concaved surfaces facing the edges of the mass under treatment, whereby said edges are turned over upon the body as the pan revolves, the shovels being made longitudinally tapering, and a third shovel likewise connected with a fixed support and located at the center diagonally of the pan, the inner shovel being adapted to direct fragments of the mass from the center of the pan to the body of the mass under treatment, as and for the purpose set forth.

AUGUSTE WIT

Witnesses:
ERNEST MORET,
LÉON AIGNED.